(12) United States Patent
Mumaw (10) Patent No.: US 6,201,216 B1
(45) Date of Patent: Mar. 13, 2001

(54) METHOD AND SYSTEM FOR WELDING RAILROAD RAILS

(75) Inventor: James W. Mumaw, Wadsworth, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 09/356,837

(22) Filed: Jul. 19, 1999

(51) Int. Cl.[7] ................................................. B23K 9/12
(52) U.S. Cl. ............................... 219/124.34; 219/125.12; 219/54
(58) Field of Search ............................. 219/54, 124.34, 219/125.12, 130.01, 130.21, 136, 137 PS; 238/164

(56) References Cited

U.S. PATENT DOCUMENTS

| | | | |
|---|---|---|---|
| 1,933,340 | * 10/1933 | Raymond | 219/125.12 |
| 3,567,899 | * 3/1971 | Iceland et al. | 219/124.34 |
| 5,773,779 | 6/1998 | Morlock. | |
| 5,877,468 | 3/1999 | Morlock. | |

* cited by examiner

*Primary Examiner*—Clifford C. Shaw
(74) *Attorney, Agent, or Firm*—Vickers, Daniels & Young (57) ABSTRACT

A method and system of depositing molten metal from an advancing welding wire to form a root pass of weld metal in the bottom of a gap between first and second metal members having generally flat base elements joined by a metal backing plate extending between said base elements, which method and system includes passing welding current between the welding wire and the metal members from a power supply to create a heat generating welding arc, moving the welding wire in a given direction along selected path over the backing plate, sensing a blow through of the backing plate by the welding arc, reversing said given direction of said welding wire for a short distance when a blow through has been sensed and then, resuming movement of said welding wire in said given direction along the selected path.

52 Claims, 10 Drawing Sheets

METHOD AND SYSTEM FOR WELDING RAILROAD RAILS

The present invention relates to a method and system for welding the spaced ends of rails and more particularly to welding two spaced railroad rails by using an electric arc welding process.

INCORPORATION BY REFERENCE

Through the years a tremendous amount of effort has been devoted to joining spaced railroad rails by some type of butt welding process. Assignee of the present application has issued patents Morlock U.S. Pat. No. 5,773,779 and Morlock U.S. Pat. No. 5,877,468, which patents are incorporated by reference herein as showing the background of the invention. These patents relate to an electric arc welding method and system for joining the ends of two spaced rails utilizing a backing between the flat bases of the rails so that the root pass or first welding layer is deposited on the backing plate spanning the gap between the rail ends as the plate is consumed. These two patents disclose in detail the total welding process above the root pass for initially joining the ends of the railroad rails and closing the gap between the rail ends. The details of such welding process do not form a part of the invention need not be repeated.

BACKGROUND OF INVENTION

When depositing the first layer of molten metal onto the top of the backing plate between the bottom ends of the rails certain difficulties have been encountered, these difficulties affect the appearance of the weld which is to be made in the field in a very short time. The advancing welding wire used in the root pass has heretofore been moved by a robotic control in a normal weave pattern where the welding wire moves back and forth between the rails as the wire progresses along the backing plate in the bottom of the gap. This procedure causes the arc to blow through the backing plate resulting in irregular undersurface for the root pass and certain malformations in the root pass. Such blow through occurs more easily when the wire is moved too rapidly and pulls away from the weld puddle. As the robotic control moves the electrode in a robotic weave axially along the root of the gap, the arc is not pointed toward the intersection between the end of the rail and the lower backing plate. This further results in certain irregularities at this intersection. This problem is accentuated due to the fact that the backing plate is a relatively thin sheet whereas the two spaced rails are massive pieces of metal. The arc blow through of the backing plate and the inability to actually have a blow through at the intersection between the plate and rail ends has presented substantial inconsistencies in the root pass of the previously performed process. These problems affect the appearance of the root pass which is a disadvantage when attempting to use this new welding process as a replacement for prior butt welding and arc welding processes used in the field.

THE INVENTION

The present invention is a method and system for depositing molten metal from an advancing welding wire controlled by a robot to form a root pass of weld metal in the bottom of a gap between the railroad rails which gap is closed by a backing plate that is between the rails and it will be described with particular reference thereto; however, the invention has broader applications and may be used in welding the ends of railroad rails having various types of lower backing plates or in other welding operations where a root pass between two heavy metal members is deposited on the top of a relatively thin backing plate or bridging element. The present invention produces a root pass which overcomes the disadvantages heretofore experienced in producing the root pass of railroad rails by melting the backing plates as metal is deposited along the backing plate.

In accordance with an aspect of the present invention, the normal robotic weave pattern heretofore used in the gap between the rails is modified to a pendulum weave wherein the advancing welding wire controlled by a robotic mechanism is swung back and forth between the two rail ends. In this manner, the welding procedure followed by the welding wire is controlled to first swing the wire between an angle pointing toward one rail end to an angle pointing toward the other rail end. After this swinging action, the robotic mechanism moves the welding wire as it points toward the intersection between the backing plate and a rail end in a longitudinal direction. This move is a short distance, often in the range of 2–3 mm when the welding wire is about 1.6 mm. Thereafter, the swinging action is accomplished in the opposite direction bringing the welding wire to a position pointing toward the opposite intersection between the backing plate and the opposite rail end. When in the second angular position, the welding wire is again shifted longitudinally to complete a cycle of movement. The cycle is repeated to define a selected path extending along the backing plate to deposit the root pass as the backing plate is melted at least on its upper surface. The backing plate defines a barrier that produces a smooth undersurface for the resulting joint created by the root pass. In accordance with this aspect of the invention, the robotic mechanism maintains the spacing of the wire holding torch above the backing plate at a constant distance during the swinging action of the welding wire carried by the torch. By using the pendulum action and maintaining a constant height above the backing plate, the welding wire produces a consistent root welding pattern.

The selected path of the welding torch is a square weave. In the path, the torch or welding wire moves perpendicularly to the end walls of the rails. This movement is accomplished by an angular swinging action of the torch directing current to the welding wire for the welding process. Upon reaching the side wall of the rail, the torch maintains its angle pointed toward the joint between the plates and rail end and then moves parallel to the side wall of the rail. After moving a short predetermined distance along the rail end, the robotic mechanism stops the torch carrying the welding wire. Thereafter, the torch and welding wire is pivoted or swung back toward the opposite rail. When the torch reaches the opposite rail, the angle of the torch carrying the welding wire is equal but opposite to the torch angle at the other side. Thereafter, a short forward movement is made by the torch and the cycle is repeated to create a selected welding pattern or path. By using this square wave, swinging or pendulum welding action, together with a maintenance of the height of the torch from the backing plate, advantages of the various aspects of the present invention are obtained.

In accordance with another aspect of the invention, the thin metal insert or consumable backing plate used to support the root pass as it is laid in place is held below the ends of the rail by protruding tabs and is supported on a ceramic tile. The backing plate spans the gap between the two objects being welded which, in the preferred embodiment, are the ends of railroad rails. By using a thin consumable backing plate, there is a possibility of arc blow through whereby the arc penetrates completely through the backing plate. Such arc blow through or blow through hole is not desirable as the wire moves transversely across the backing plate. The structural defect of a blow through is corrected by using the present invention. The disadvantage of this blow through is that it tends to create a cutting action as the torch swings transversely across the insert. To prevent such blow through, it is necessary to keep a puddle of metal under the arc as it is advancing between the rails. When the torch is moved too rapidly and is ahead of the weld puddle or the weld puddle flows away from the arc, the propensity for an unwanted arc blow through is substantially increased. Thus, it is advantageous to prevent the cutting action of a blow through by maintaining a wire movement speed along the selected path at a rate where a molten puddle is maintained between the arc and the plate being consumed. This can not always be done; therefore, the present invention provides an arrangement for detecting and compensating for unwanted arc blow through as the electrode or wire pivots between the ends of the rails. Blow through is detected by a monitoring system based upon a reading or sensing of the weld current. When the welding arc punches through the insert, the wire stick-out ESO from the torch increases. This causes an increase in the resistance of the welding operation. The power supply used in the welding method and system has a constant voltage control. The voltage is maintained constant by the power source. As the resistance increases during an arc blow through, the welding current has a corresponding decrease. Consequently, there is a direct correlation between the electrode stick-out and the welding current. By measuring or sensing the current, a blow through can be detected by a current decrease below a certain value. This value changes with various welding wires used in the root pass welding process. A primary aspect of the present invention provides a corrective response to an arc blow through occurring when the torch is swinging between the rails. The corrective action prevents a cutting process in the very thin backing plate. In the primary or practical implementation, the wire is moved back to the starting point of a transverse swing when a blow through is sensed. A second embodiment includes merely moving the wire back a short distance when a blow through is sensed in a transverse swing of the wire.

An automatic controller moves the torch in the selected path or pattern described in detail above. This automatic controller and the robot is responsible for movement of the torch and can adjust the torch movement based upon feedback from the welding operation. This is standard technology for controlling the movement of the electrode by the robotic mechanism for moving the torch through the selected path or pattern. When the current is sensed to be below a set value, an arc blow through is detected. When this occurs, the automatic controller in the robot mechanism moves the torch in the reverse direction back to the previous decision point or for a short distance in the selected pattern. The welding wire is melted and fills the blow through opening or hole so that the welding process can continue uninterrupted across the previously blown through hole in the backing plate. The torch returns to its movement normal pattern and is moved back across the previous blow through location. The molten metal ahead of the torch fills any hole created by the blow through. By permitting the welding process to continue a puddle of weld metal is allowed to build up under the arc. The metal fills the hole created by the blow through so that the reversal of the torch for a short time or distance or to a prior decision point fills the blow through hole at once. Thus, the blow through defect is overcome and the welding process continues. In summary, as the torch is swung back and forth, the current is monitored. If the current drops below a relatively low value, indicative of a blow through, the swinging action of the torch is reversed to fill the blow through so that the torch can resume its normal movement along the selected pass. This same action can occur as the torch is moving longitudinally between the portions of the selected pattern defined by a swinging action of the torch; however, these branches are so short and require a blow through to fill the fillet area. The invention assures at least a blow through in successive longitudinal movements on each fillet of the gap. If a blow through is detected, it is recorded. In this manner, a blow through can be forced in the next longitudinal branch on the same side of the gap when there has been no sensed blow through.

In accordance with still another aspect of the invention, the intersection or joint between the end of a rail and the backing plate is processed to provide a fillet weld as the angled torch is moved along this joint. The fillet weld is between the thick heavy end of a rail and the thin backing plate. This fillet welding aspect of the present invention can be used in various other joints where a heavy piece of metal is connected to a thin metal plate. In the fillet weld in the junction between the backing plate and the end of a rail, it is desirable to have nearly 100% penetration to produce a smooth contour on the back side of the weld. This smooth contour crucial to proper appearance of the root weld. In this fillet area of the root pass, an arc blow through is wanted to control the penetration of molten metal between the insert and the rail. If inadequate penetration occurs, the base metal at the fillet weld joint is not be completely consumed. This leads to a cold laps or notches on the backside of the weld. If there is too much penetration at this weld junction, a sharp re-entry angle may be formed from the backside of the weld. In addition, the metal overlaps the parent material of the rails forming a notch. These are disadvantages overcome by the present invention whereby a controlled arc blow through is automatically accomplished periodically along the fillet weld. The automatic control allows a weld motion controller, such as in a robot mechanism, guarantees periodic blow throughs in the fillet weld, at least in successive longitudinal branches of the weld pattern. By sensing and controlling the number and position of the periodic blow throughs an ideal weld in the fillet area of the root pass is obtained. Assurance of periodic arc blow throughs in the fillet joint is the objective of this aspect of the invention. When moving the torch along the selected path, at the intersection between the swinging action and the longitudinal movement, there is a decision point. These decision points extend along the fillet joint. When the arc reaches one of these decision points, it is determined whether there has been arc blow through as sensed by a drop in arc current. If there is a blow through, this is recorded. If there is no blow through at a first longitudinal branch in the section of the fillet joint, the torch continues to cross the gap and can come back to the next longitudinal branch on the same side of the gap. At this next longitudinal branch along the junction between the backing plates and edge of the rail a blow through must occur. In other words, there must be a blow through in accordance with this aspect of the invention at a first or second successive branch constituting the short longitudinal branches of the torch as it moves along the rail. If there is not a natural blow through at the second branch, then the voltage is decreased reducing the foot print of the arc. This causes a sharp penetration of the arc and creates a forced blow through. By having a blow through, forced or unforced, at least one time during each successive longitudinal branches along the fillet between the swinging action of the torch, a fillet joint is created that has nearly 100% penetration. This aspect of the present invention maintains a quality fillet weld in the root pass.

The present invention is performed by standard robotic control or mechanism as used to perform the welding operation in Morlock U.S. Pat. No. 5,773,779 and Morlock U.S. Pat. No. 5,877,468. In accordance with the present invention, there is provided a method of depositing metal from an advancing welding wire carried in a torch to form a root pass of weld metal in the bottom of a gap between first and second metal members, preferably railroad rails, which members have generally flat base elements joined by a metal backing plate extending between the base elements. The method comprises passing welding current between the welding wire in the torch and the metal members from the power supply to create a heat generating welding arc, moving the welding wire in a given direction along a selected path over the backing plate, and sensing an arc blow through of the backing plate by the welding arc. In one embodiment, a sensed blow through causes reversal of the given direction of the welding wire or torch for a short distance of less than about ¼ inch when a blow through has been sensed and then resuming movement of the welding wire or torch in the given direction along the selected path. In this manner, when there is an unwanted blow through of the backing plate, the torch moves back slightly allowing molten metal to fill the blow through hole so the welding process can continue uninterrupted without cutting a kerf in the bottom backing plate. In the present implementation of the invention, there are computer recognized decision points at each change in direction of the selected path between a transverse branch and a short longitudinal branch. When a blow through is sensed, the torch or welding wire is reversed in direction and goes back to the previous decision point. The invention also senses a wanted or forced blow through in the fillet area to assure periodic blow through holes to provide excellent penetration.

In accordance with another aspect of the present invention, there are a series of decision points in the selected path as the torch moves at an angle along the fillet between the backing plate and the end of one of the rails. At each of these decision points, a determination is made whether an arc blow through, forced or unforced, has occurred. If there has been no arc blow through in two adjacent decision points in one longitudinal branch of the fillet weld, the voltage of the power supply is decreased to reduce the footprint of the arc causing a concentrated arc and thus a forced blow through. By using this aspect of the invention, in combination with the other aspect of the invention, an improved root pass is created along the upper level of the consumable backing plate and in the fillet areas.

The primary object of the present invention is the provision of a method and system for creating a root pass between the ends of two large metal members.

In accordance with still a further object of the present invention, there is provided a method and system as defined above, which method and system is easily implemented with standard robotic control mechanisms so a quality root pass can be deposited to fill the gap between the ends of the railroad rails.

Still a further object of the present invention is the provision of a method and system, as defined above, which method and system utilizes the arc current to determine when there has been an unwanted arc blow through whereby the blow through hole can be filled. Blow throughs are intentionally created in the fillet areas to produce an ideal fillet weld for the root pass.

Another object of the present invention is the provision of a method and system as defined above, which method and system senses blow through and fills the unwanted blow through holes.

Still a further object of the present invention is the provision of a method and system, as defined above, which method and system create a fillet weld between the rails and the backing plate by using an intermittent series of forced blow throughs to provide desired penetration.

These and other objects and advantages will become apparent from the following description taken together with the accompanying drawing.

BRIEF DESCRIPTION OF THE DRAWINGS

FIG. 6 is a schematic view of the torch carrying the welding wire moving across the backing strip and creating an arc blow through;

FIG. 14 is a schematic wiring diagram illustrating the sensing circuit for sensing an arc blow through and adjusting the robotic control mechanism for taking correction action after a blow through;

PREFERRED EMBODIMENT

Figure 1:
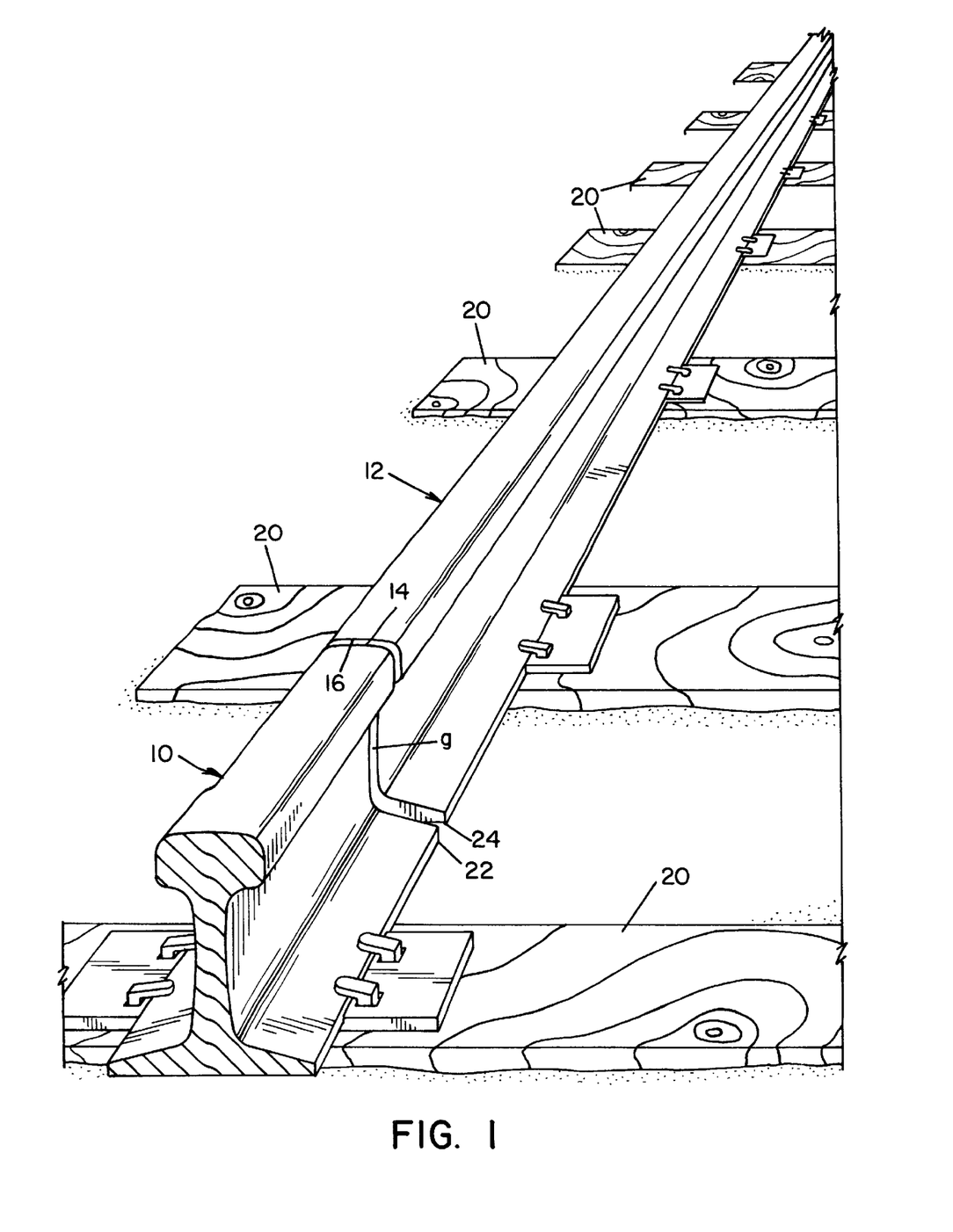
FIG. 1 is a pictorial view of two railroad rails with a gap g to be filled by a robotic controlled arc welding process as disclosed in Morlock U.S. Pat. No. 5,773,779 and Morlock U.S. Pat. No. 5,877,468.
Figure 2:
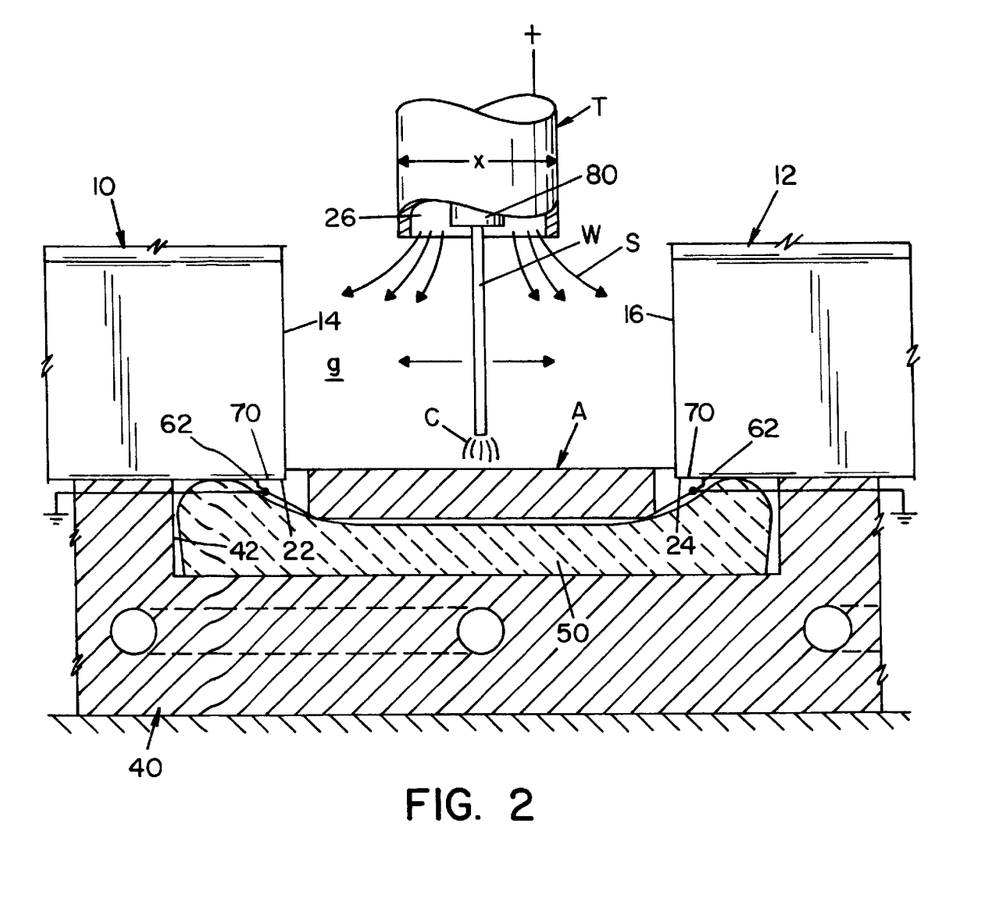
FIG. 2 is an enlarged cross sectional area at the bottom of the gap between the rails showing a torch type used in practicing the present invention and as used in the prior patents by Morlock assigned to the present assignee.
Figure 3:
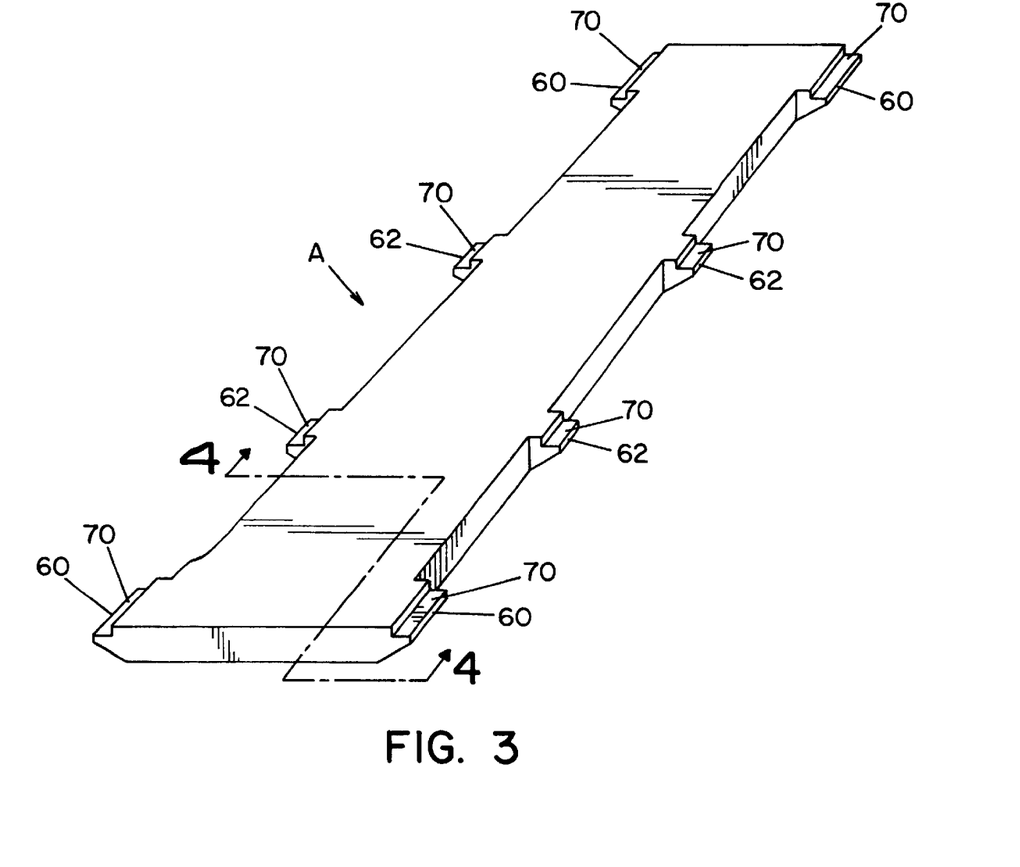
FIG. 3 is a pictorial view of the backing plate used in the preferred embodiment of the present invention.
Figure 4:
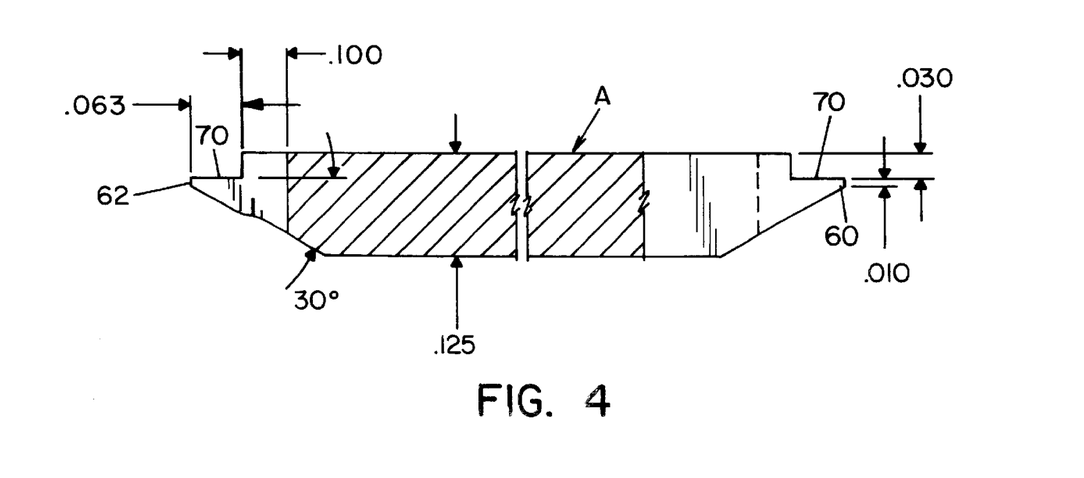
FIG. 4 is an enlarged cross sectional view taken generally along line 4—4 of FIG. 3.
Figure 5:
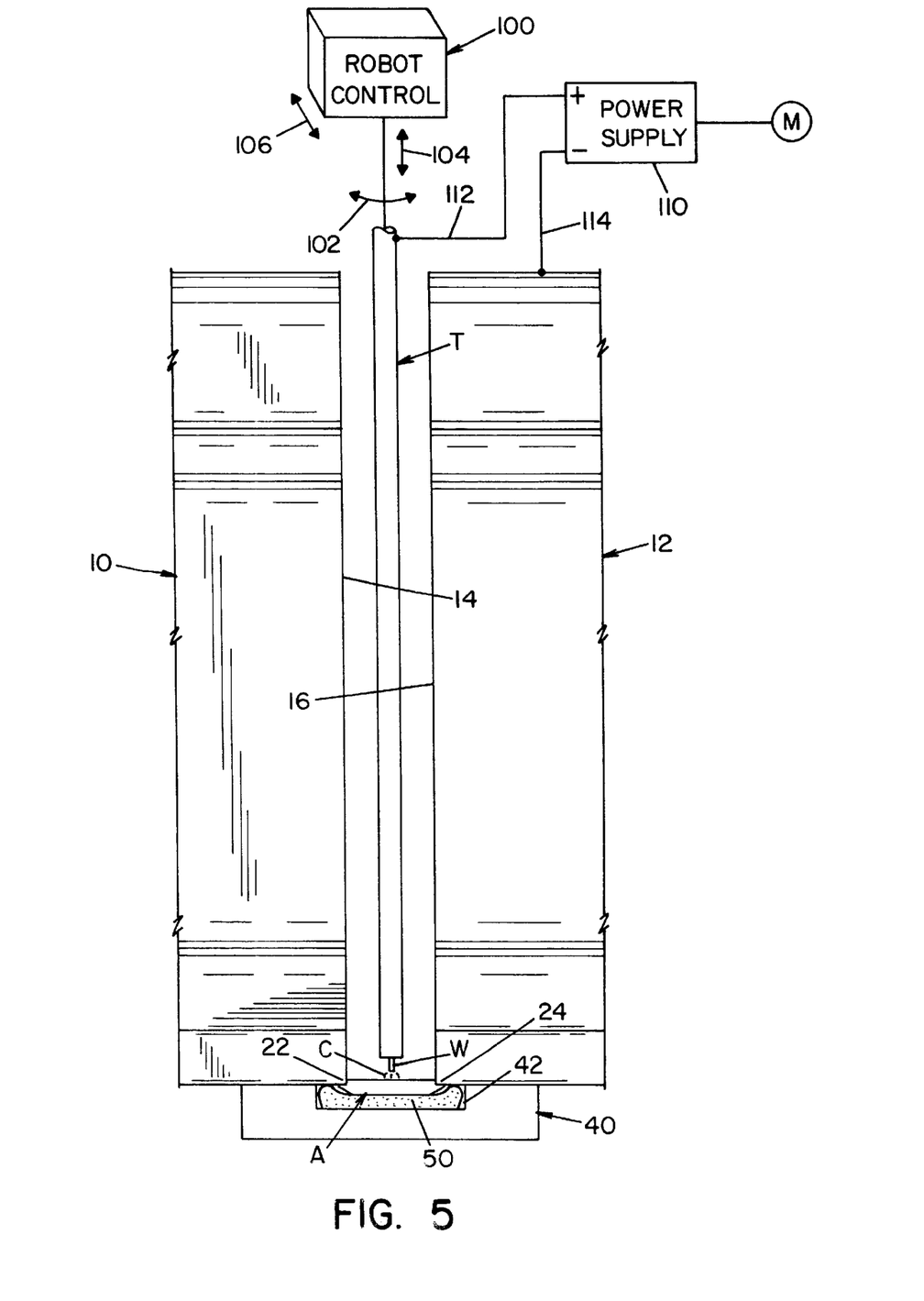
FIG. 5 is a side view illustrating a welding gap in the robotic control mechanism and power supply used in the preferred embodiment of the present invention to provide the root pass in the gap.

Referring to the drawings wherein the showings are for the purpose of illustrating a preferred embodiment of the invention only, and not for the purpose of limiting same, FIG. 1 shows two spaced railroad rails 10, 12 mounted on railroad ties 20 and provided with a gap g between oppositely facing surfaces 14, 16, respectively. The gap g is provided between the rails for the purposes of joining the rails in the field by using a robotic control mechanism to perform a welding operation as illustrated in Morlock U.S. Pat. No. 5,773,779 and Morlock U.S. Pat. No. 5,877,468. Gap g is above flat base portions 22, 24, which portions are used to support a lower backing plate A, positioned below flat bases 22, 24 to define the root pass area. A root pass is the first layer of molten metal to be deposited by the electric arc welding process in gap g. As shown in FIGS. 2–4, backing plate A is supported in the longitudinally extending recess 42 in copper shoe 40 so that recess extends between rails 10, 12 to receive a ceramic tile or element 50. This element holds lower backing plate A against the lower sides of flat bases 22, 24 of rails 10, 12, respectively. As shown in FIGS. 3 and 4, backing plate A has outwardly protruding end tabs 60 and a number of center tabs 62, which number is determined by the length of the gap g. Consumable plate A is supported on ceramic tile or element 50 and is held against edges 22, 24 by notches 70 having the preferred dimensions set forth in FIG. 4. The dimensions of plate A are also provided for a gap g having a width of approximately 1.0 inches. Molten metal of the root pass is deposited on the top of consumable plate A after the plate is assembled as shown in FIGS. 2 and 5. Welding torch T of an electric arc welder is moved in accordance with a robotic control mechanism 100 to follow a desired or selected welding pattern or path during the root pass welding operation. Torch T has a diameter x with a cylindrical housing surrounding wire holder 80 for directing welding wire W toward plate A. An appropriate power supply 110, in practice a constant voltage power supply, directs current flow at lines 112, 114 through welding wire W to plate A to create an electric arc C, which arc creates the heat used to melt advancing wire W to create molten metal that is deposited on plate A. The molten metal melts the plate and creates a root pass joining bottom flat areas 22, 24 preparatory to subsequent upper welding to fill gap g. The distance between holder 80 and plate A is the stick-out ESO, which stick-out determines the resistance of the welding operation as seen by power supply 110. Shielding gas S enters gap g through passage 26, between holder 80 and the outer housing of torch T. As so far described, the root pass welding process is the same procedure being tested by assignee of the present application.

Movement of torch T moves welding wire W along plate A to lay the root pass metal. This movement is provided by a standard robot control mechanism 100, which uses software to perform selected operations and employs real time feedback controls. In accordance with the invention, torch T is moved an arcuate or swinging transverse direction 102 while it is moved a vertical direction 104. Between the swinging action, torch T is moved in the longitudinal direction parallel to ends 14,16 as indicated by arrows 106. In accordance with the invention, torch T is swung transversely as indicated by arrow 102. During the swinging action, the robotic control mechanism adjusts the vertical height as indicated by arrows 104 so that the vertical height of the torch above backing plate A (ESO) remains constant. Thus, the stick-out is the same as torch T moves along the selected weld path. Control mechanism 100 causes torch T to travel in a preselected pattern or path in laying the root pass over consumable plate A. The selected path is an aspect of the present invention; however, it will be described later since it is not necessary for practicing the broadest aspect of the invention as shown in FIGS. 6–15.

Figure 6:
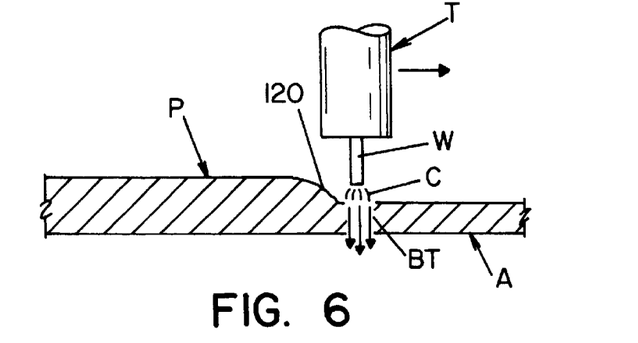
Figures 7, 8, 9:
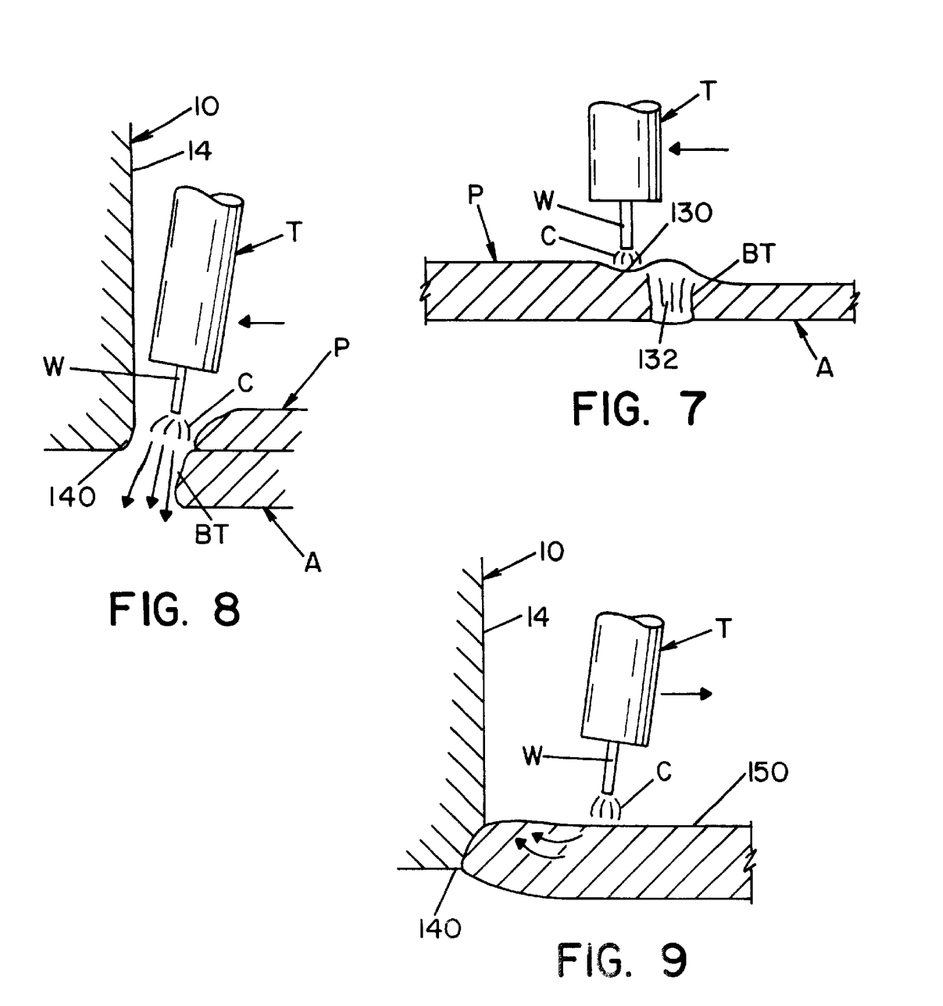
FIG. 7 is a view similar to FIG. 6 showing the corrective action taken in accordance with the present invention after a blow through occurs in the backing plate.
FIG. 8 is a schematic cross sectional view at the fillet junction between the backing plate and one of the rails illustrating an arc blow through created in accordance with an aspect of the present invention.
FIG. 9 is a view similar to FIG. 8 showing corrective action of the torch taken after the blow through has occurred.
Figure 22:
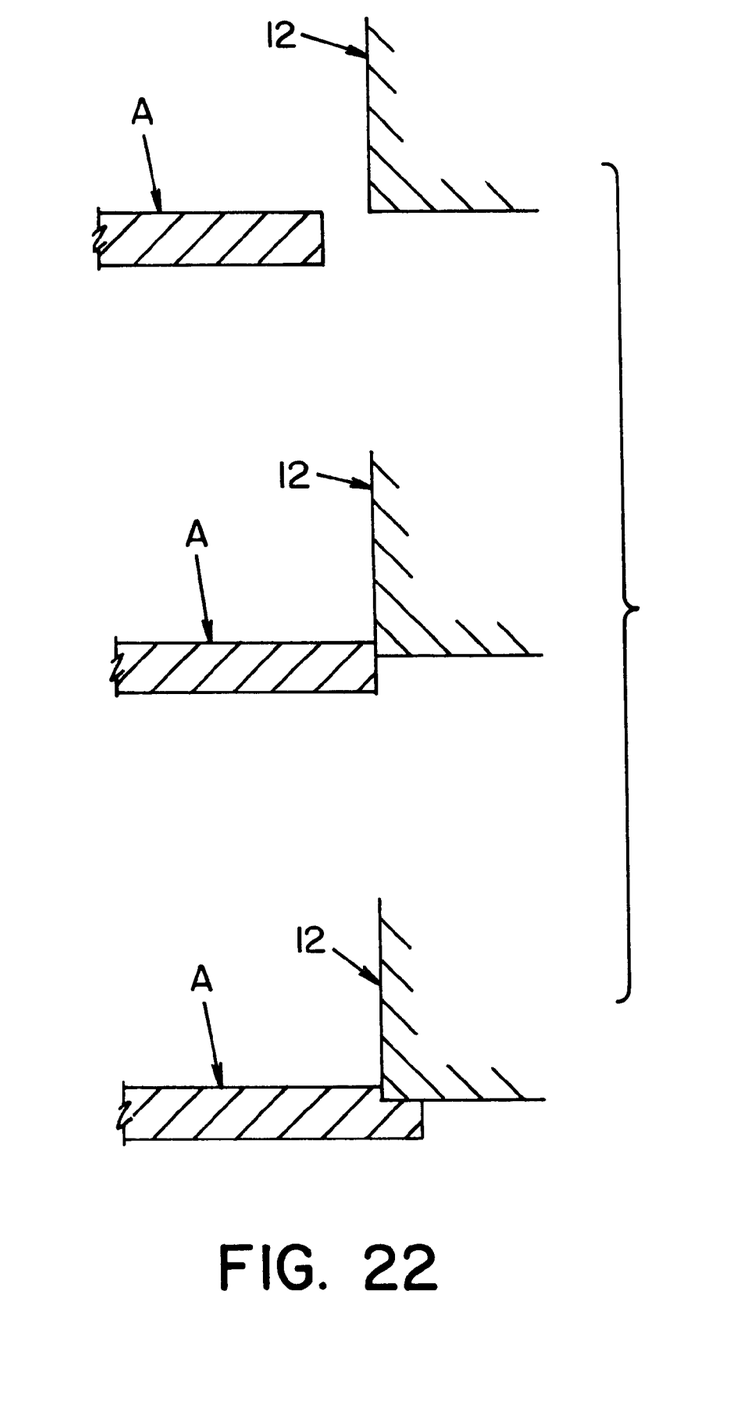

Referring now to FIGS. 6 and 7 the broad aspect of the present invention is illustrated. When torch T is transversely moving across backing plate A, wire W is melted by arc C as is the consumable back plate A. This creates a molten metal puddle P. As shown in FIG. 6, when welding wire W is moved by torch T at a rate greater than the formation of puddle P, the arc moves forward of the end 120 of puddle P to have a high tendency to cause a blow through indicated as hole BT. If correction action is not taken, hole BT becomes a kerf and cuts along plate A causing the plate to have a rough and uneven undersurface with metal protrusions. In accordance with the invention, the blow through that creates hole BT is sensed. When a blow through is detected, torch T is reversed in its movement along the selected welding path. When this occurs, wire W and arc C are at a position over the puddle as shown in FIG. 7. This causes the molten puddle to have a cavity 130; however, the molten metal in puddle P fills hole BT. Thereafter, torch T moves in the direction indicated in FIG. 6 over the filled blow through hole. Consequently, in this aspect of the invention, a blow through is detected. Torch T is reversed to fill the blow through hole and create a molten metal puddle below torch T. The puddle prevents arc blow through. As shown in FIG. 8, torch T has been pivoted toward end 14 of rail 10. At the intersection between plate A and edge 140, there is an illustrated blow through causing hole BT. When this occurs, torch T is reversed in direction as shown in FIG. 9 allowing puddle P to move forward and form a fillet between edge 140 and plate A now shown as molten metal mass 150. In this illustration, an unforced blow through occurs as the wire reaches edge 140. The reversal of torch T is in the transverse direction. If a blow through occurs as the torch is moving along edge 140, no reversal will take place. The blow through forms an ideal fillet joint at the lower edge 140 of rail 10. As will be explained later, it is desirable to periodically cause a blow through at the fillet joint along edge 140 of the rails 10, 12. If there is no unforced blow through, a blow through is forced by another aspect of the present invention as schematically illustrated in FIGS. 10–13. At the fillet, the wire will experience various conditions as shown in FIG. 22. With a gap as shown in the top view, a blow through is highly probable. With an overlap as shown in the bottom view, a forced blow through will most likely be needed.

Figure 10:
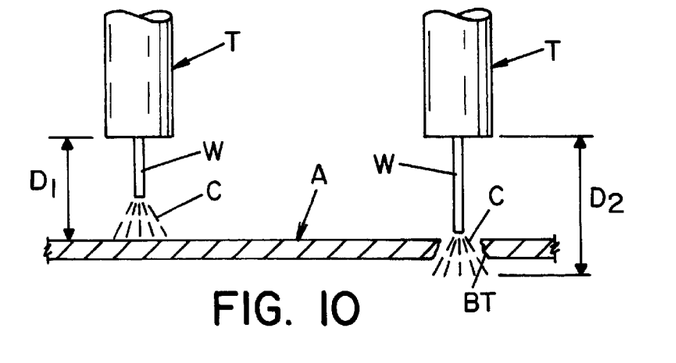
FIGS. 10–13 are schematic views illustrating the concept of arc blow through and control of the blow through by arc adjustment of the power supply.
Figure 11:
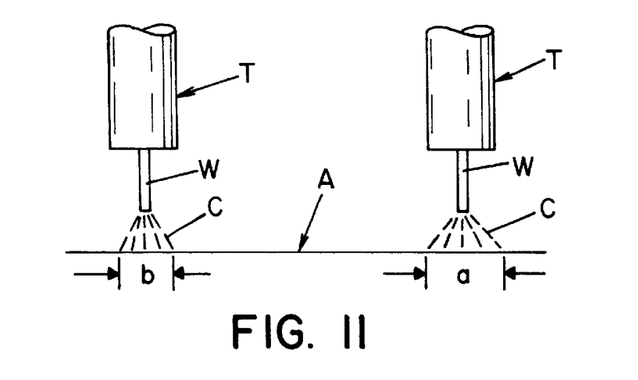
Figure 12:
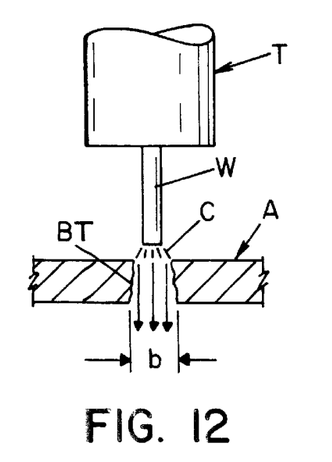
Figure 13:
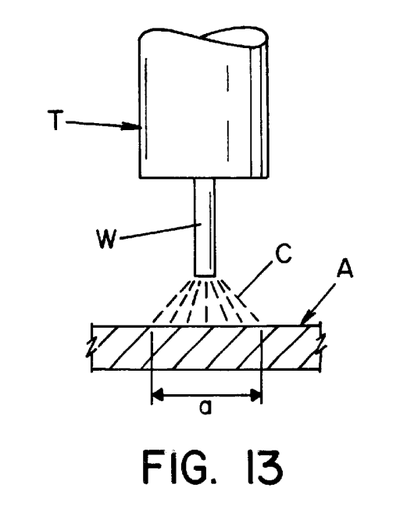

As indicated in FIG. 10, the stick-out $D_1$ between the holder in torch T remains constant during the movement of torch T to form the root pass at fillet edges 140. As shown in the right in FIG. 10, when there is a blow through, hole BT causes the stick-out to be substantially greater as indicated by $D_2$. Consequently, with a greater stick-out in a welding operation using a constant voltage power supply 110, the arc current is reduced during arc blow through. In accordance with the invention, the arc current is sensed. The value of current is used to detect a blow through to take the correction action as illustrated in FIGS. 7 and 9. To cause a forced blow through when needed in the fillet area at the edges 140, the procedure illustrated in FIG. 11 is utilized. As shown on the right, torch T moves along plate A and melts wire W by the heat of arc C. During normal operation in depositing molten metal from wire W onto plate A, the plate A is also consumed by the heat of the arc. As illustrated, arc C has a nominal diameter above plate A. As arc C moves toward the fillet area, it retains its general diameter a. Upon reaching fillet area at edge 140, as will be described later, there may not be an arc blow through, which may be determined by the fillet geometry shown in FIG. 22. To create an ideal fillet joint at edges 140, however, there is a. need for a periodic blow through especially in the area of tabs 60, 62. This area is shown at the bottom view in FIG. 22. A blow through is desired at least periodically in the fillet area. To force a blow through, the voltage of power supply 110 is reduced. The reduction of the voltage causes the diameter of arc C to be reduced as shown by diameter b for torch T at the left in FIG. 11. When this occurs, there is a more concentrated arc having a greater arc force and a smaller footprint than the large footprint shown on the right. This creates a forced blow through when required in the fillet area at edge 140. The large footprint of a normal arc is illustrated in FIG. 13, whereas the small footprint of a forced blow through arc is shown in FIG. 12 where the arc caused a blow through hole BT. This concept is used in accordance with the present invention when it is desired to have a forced blow through to control the welding between plate A and the edge 140 along the bottom base of rails 10, 12. An aspect of the invention uses this forced blow through procedure as will be explained later.

Figure 14:
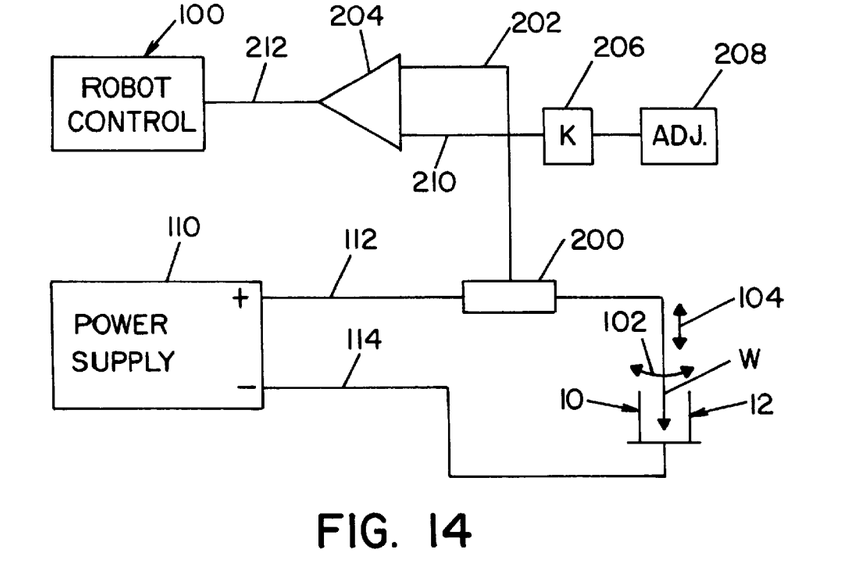
Figure 15:
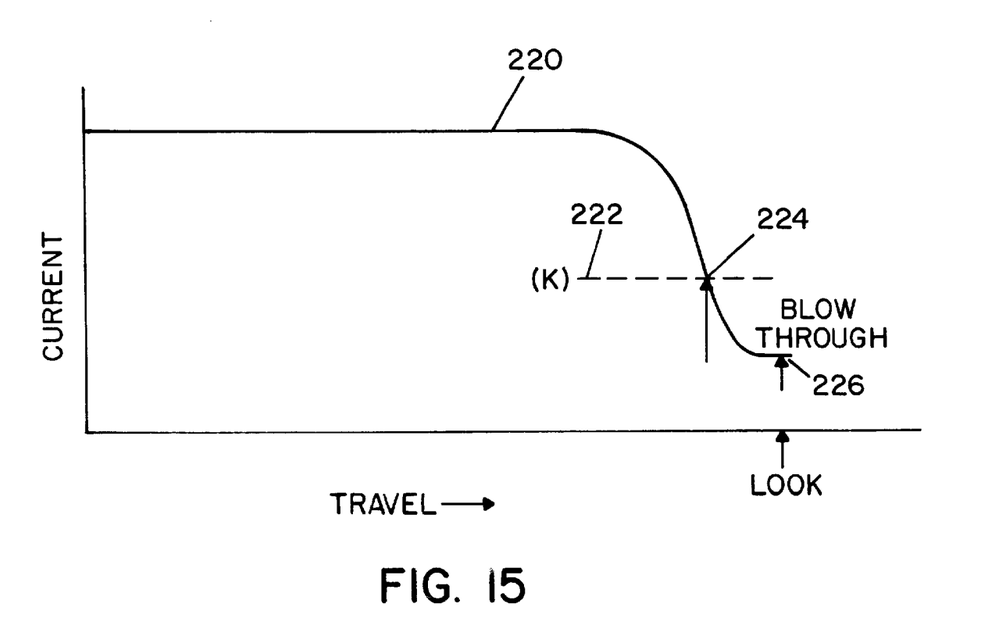
FIG. 15 is a graph showing the operating parameters of the control circuit shown in FIG. 14.
Figure 16:
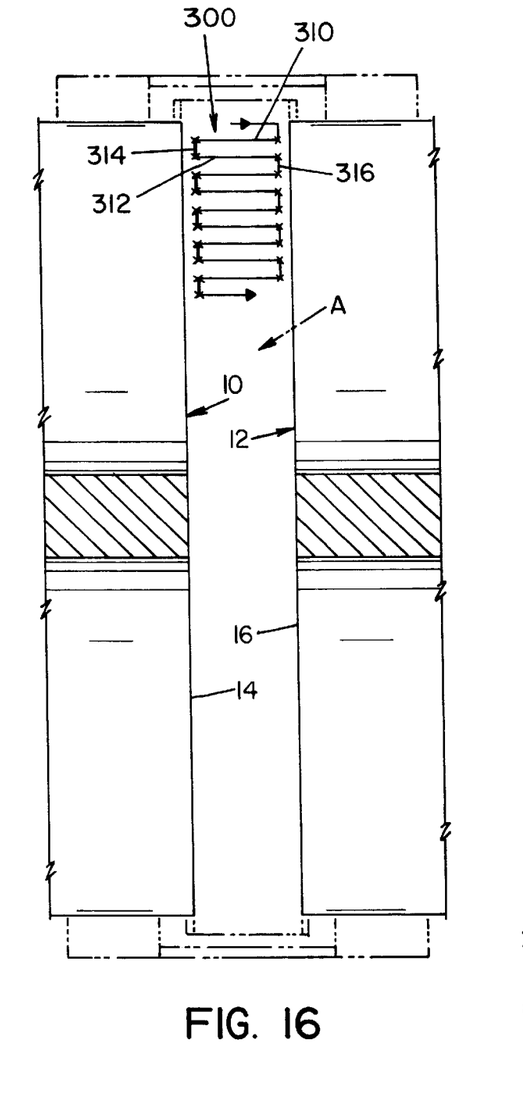
FIG. 16 is top plan view of the welding gap above the backing plate showing the selected weld pattern created by the robotic control mechanism in accordance with the present invention.

To determine when there is a blow through for reversal of the direction of the torch the control system illustrated in FIG. 14 and shown in the graph of FIG. 15 is employed in the preferred embodiment. Shunt 200 continuously measures the arc current between wire W and rails 10, 12 as torch T follows along the selected path, as illustrated in FIG. 16. The voltage in line 202 is directed as one input of comparator 204. The other input to the comparator is the output of a threshold value as set in block 206. The value is adjusted according to the wire being used by adjusting network 208. By comparing the output of circuit 206 at line 210 with the representative voltage on line 202, comparator 204 shifts the logic on output line 212 whenever the voltage on line 202 reaches the voltage on line 210. This indicates a blow through and is represented by a change of logic on output line 212. This logic is directed to one input of robotic control mechanism 100 to indicate that a blow through has occurred. When that happens, the robotic control mechanism reverses the direction of torch T for a very short distance to allow the molten metal under the welding wire to fill hole BT, as shown in FIGS. 7 and 9. Thereafter, torch T moves forward for continuous welding operation. Wire W moves along the preselected path continuously. Upon detecting a blow through the wire merely reverses for a short distance and then continues forward. This is a substantial advance in the technology for laying the root pass between rails 10, 12. As illustrated in curve 220 shown in FIG. 15, the welding current remains generally high until there is a blow through. At that time, the welding current decreases because the stick-out increases and the voltage of power supply 110 is at a set value. As the current decreases, it reaches the set value of circuit 206 shown as line 222. Thus, at point 224 there is an indication of a blow through and control mechanism 100 reverses the direction of the torch for a selected distance. This distance in the implementation of the present invention when in branches 310, 312 is back to the prior decision point. In another embodiment, the distance is a short distance, such as about ¼ inch. In longitudinal branches, there is normally no reversal because these branches are not much longer than the diameter of the welding wire. The wire diameter in practice is about 1.6 mm and branches 314, 316 are 2–3 mm. In some instances, controller 100 periodically looks at the current from shunt 200 appearing as a voltage on line 204. In this instance, a blow through is detected whenever the current is below line 222 at a "look" subroutine. If a look command is given by the software operating robot control mechanism 110 at time 226, the robotic control detects the existence of a blow through and immediately implements the procedure of reversing the direction of the torch for a short period of time. In practice, the reverse motion moves the torch to the previous 'look' position and back again. Forward motion is then resumed if no blow through is then detected.

Figure 17:
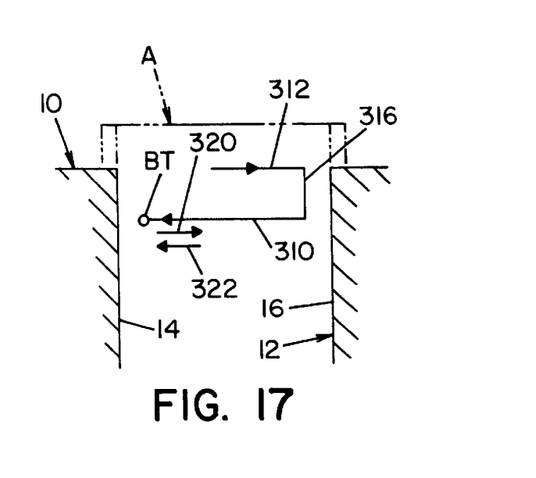
FIG. 17 is an enlarged view of a portion of the weld pattern shown in FIG. 16 showing aspects of the present invention.
Figure 18:
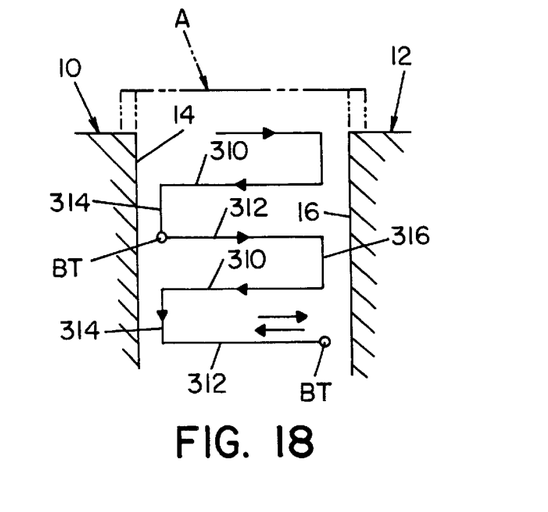
FIG. 18 is view similar to FIG. 17 showing further control aspects of the present invention as the weld torch progresses along the selected pattern.
Figure 19:
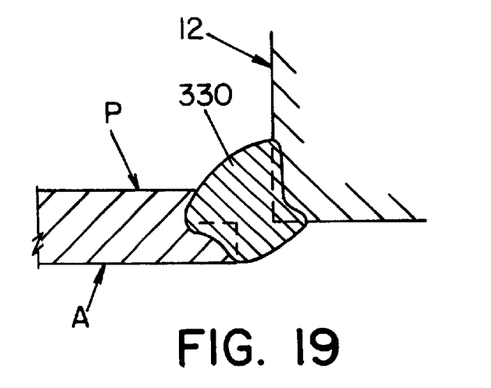
FIGS. 19–21 are cross sectional views of the fillet area of the root pass showing three penetration conditions, one of which is obtained by using the present invention; and, FIG. 22 is a composite view showing three fillet conditions between the plate and rail that can be encountered when using the present invention.
Figure 20:
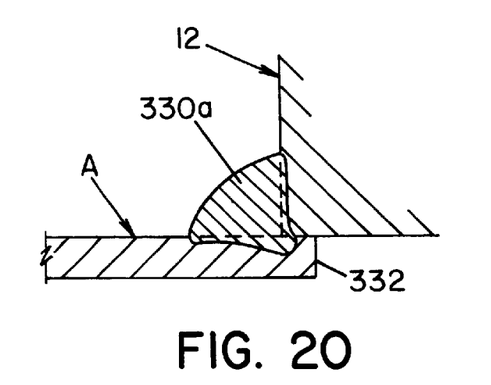

Referring now to FIGS. 16–18, in accordance with the invention, torch T is moved in the selected path 300 shown in FIG. 16. This path includes a series of cycles including transverse branches 310, 312 and connecting longitudinal branches 314 and 316. Torch T swings along transverse branch 310 to a position shown in FIG. 8. It then moves longitudinally along fillet edge 140, as branch 314. Branch 314 has a short length necessary to cause overlapping of molten metal and is generally only slightly larger than the diameter of the wire being used for forming the root pass. With the wire 1.6 mm in diameter, the branches 314, 316 are about 2–3 mm in length. Thereafter, torch T swings along branch 312 and then moves longitudinally along edge 140 along branch 316. This cycle is repeated to lay a total weld on consumable backing plate A. The selected path 300 is generally rectilinear indicating transverse movement of the torch or orthogonal longitudinal movement of the torch. As shown in FIG. 17, if there is a blow through BT along path 310, torch T reverses direction as indicated by arrow 320 and then resumes its original movement as indicated by arrow 322. If the blow through in branch 310 is at edge 140, as shown in FIG. 8, reversal movement is caused along transverse branch 310, back to branch 316 or back a short distance. This allows closing of the blow through hole BT, as shown in FIG. 9. If the blow through is in branch 310 but spaced from the edge 140, the same thing occurs and the blow through hole BT is filled. As shown in FIG. 18, there are two blow throughs BT. In the first instance, blow through is recorded for this branch and will not be forced on the next 314 branch. In the second instance, blow through has been detected along the 312 branch, thus a reversing motion will take place before resuming forward motion along branch 316. Referring again to FIG. 16, the right angle intersection between branches 310, 312, 314 and 316 are marked with a cross. These crosses are decision points for the software program controlling the root pass welding process. All the decision points, in the current implementation of the invention, are along the fillet edge 140 between backing plate A and rails 10, 12. Decision points can be located at selected positions in pattern 300. As the torch reaches these decision points as it moves along the selected path 300, control mechanism 100 determines if there has been a blow through prior to this decision point. If the decision point is at the end of branch 310 or branch 312, then an immediate reversal is done, back along these branches to the previous decision point. Then forward motion is resumed to trace pattern 300. If the decision point is at the end of branch 314 or branch 316, then the blow through is noted by recording in memory and this information is used to determine the arc characteristic for the next time a corresponding longitudinal branch is reached. The stored data is used to determine the ratio of longitudinal branches that need blow through to longitudinal branches that do not need blow through. In accordance with an aspect of the invention, control mechanism 100 has a software program that determines the ratio of blow throughs in the longitudinal branches. The fillet weld between backing plate A and rail 10 needs a blow through on every other longitudinal branch 314 and every other branch 316. If there has not been a blow through on the previous longitudinal branch 314 or branch 316, then when the decision point at the leading edge of the next longitudinal branch is reached two events occur. If blow through is present at the leading edge of the branch, the program continues as normal. If no blow through is detected, then the voltage of power supply 110 is reduced at lines 112, 114 to decrease the footprint of the arc causing a blow through as discussed in conjunction with FIGS. 10–13. If blow through was present at the previous branch 314 or branch 316 and blow through is again present at the next branch, then voltage of power supply 110 is raised at lines 112, 114 to increase to footprint of the arc to minimize the chance of another blow through. In summary, each rail has the correct ratio of blow throughs. In accordance with this aspect of the present invention, each of the longitudinal branches 314, 316 has the proper number of blow throughs needed to cause the molten metal to fill the fillet area as shown in FIG. 19. As shown in FIG. 20, if there is inadequate blow through in one of the short longitudinal branches 314, 316, the molten metal bead 330a does not extend through backing plate A, leaving a notch 332 below rail 12. This notch is not desirable. By using the present invention, even if there is a substantial space between the edge of plate A and fillet edge 140 of rail 12, as shown in the top view of FIG. 22, there would not be excessive penetration as shown by the molten metal mass 330b in FIG. 21.

In accordance with another operation scheme, control mechanism 100 has a software program that determines if there is a blow through at one of the decision points. If there has not been a blow through at the leading end of branch 314, there must be a blow through at the trailing end of this branch. Consequently, if there is no blow through at both ends of this longitudinal branch, the voltage of power supply 110 is reduced to decrease the footprint of the arc causing a blow through as discussed in conjunction with FIGS. 10–13. In summary, in this program there is at least one blow through in each of the longitudinal branches 314, 316, whereas the preferred system includes a blow through in at least every other longitudinal branch on each side of the gap. In accordance with this second aspect of the present invention, each of the branches 314, 316 has at least one blow through which causes the molten metal to fill the fillet area as shown in FIG. 19. Plate A has an upper puddle P and is filled with molten metal bead 330 forming a quality bridge with rail 12 at its lower edge during the root pass welding procedure. As shown in FIG. 20, if there is no blow through in the short longitudinal branches 314, 316, the molten metal bead 330a does not extend through backing plate A, leaving a notch 332 below rail 12. This notch is not desirable. By using this second present invention even if there is a substantial space between the edge of plate A and fillet edge 140 of rail 12, as shown in the top view of FIG. 22, there would not be excessive penetration as shown by the molten metal mass 330b in FIG. 21.

Figure 21:
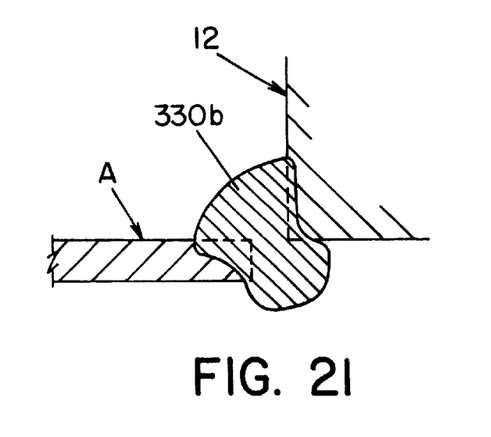

Without using the present invention, a large gap as shown in FIG. 21 would cause over penetration to produce the excessive globular molten metal below the rail, as shown in FIG. 21. Thus, the use of the present invention allows compensation for large spacing between plate A and rail 10 or rail 12. If there is not enough spacing and there is no blow through, then the present invention creates a blow through. In both instances, the fillet molten metal for the root pass is the type shown in FIG. 19 and not the type shown in either FIG. 20 or FIG. 21. Thus, irrespective of the position of plate A with respect to rail 12 as shown in FIG. 22, the same ideal fillet weld is created.

Having thus defined the invention, the following is claimed:

1. A method of depositing molten metal from an advancing welding wire to form a root pass of weld metal in the bottom of a gap between first and second metal members having generally flat base elements joined by a metal backing plate extending between said base elements, said method comprising:
   (a) passing welding current between said welding wire and said metal members from a power supply to create a heat generating welding arc;
   (b) moving said welding wire in a given direction along selected path over said backing plate;
   (c) sensing a blow through of said backing plate by said welding arc;
   (d) reversing said given direction of said welding wire when a blow through has been sensed; and,
   (e) then, resuming movement of said welding wire in said given direction along said selected path.

2. A method as defined in claim 1 wherein said sensing act involves measuring said welding current while holding the voltage of said power supply constant and detecting a blow through when said welding current is below a set level.

3. A method as defined in claim 2 including the act of adjusting said set level for different welding wires.

4. A method as defined in claim 2 wherein said selected path includes a number of cycles each having a first transverse branch extending from first element to said second element and a successive second transverse branch extending from said second element to said first element with longitudinal branches connecting successive transverse branches and generally perpendicular to said transverse branches and adjacent the intersection of said backing plate and one of said members.

5. A method as defined in claim 4 wherein said branches of selected path includes a number of longitudinally spaced direction changing decision points at the intersection of said backing plate with one of said members where said path is changed generally orthogonally from one branch to the next branch.

6. A method as defined in claim 5 including determination at said decision points the existence of a blow through between said backing plate and one of said metal members.

7. A method as defined in claim 6 including reversing said given direction upon detection of a blow through to move said welding wire back to a decision point and then resuming movement in said given direction.

8. A method as defined in claim 6 including advancing to the next decision point upon failure to detect a blow through.

9. A method as defined in claim 6 including selectively forcing a blow through upon failure to detect a blow through.

10. A method as defined in claim 9 wherein said forced blow through is created by reducing the voltage of said power supply.

11. A method as defined in claim 9 wherein said forcing act is performed upon failure to detect a blow through at a number of successive decision points.

12. A method as defined in claim 11 wherein said forced blow through is created by reducing the voltage of said power supply.

13. A method as defined in claim 12 including determination at said decision points the existence of a blow through between said backing plate and one of said metal members.

14. A method as defined in claim 13 including reversing said given direction upon detection of a blow through to move said welding wire back to a decision point and then resuming movement in said given direction.

15. A method as defined in claim 13 including advancing to the next decision point upon failure to detect a blow through.

16. A method as defined in claim 13 including selectively forcing a blow through upon failure to detect a blow through.

17. A method as defined in claim 16 wherein said forcing act is performed upon failure to detect a blow through at a number of successive decision points.

18. A method as defined in claim 17 wherein said number is two.

19. A method as defined in claim 17 wherein said forcing act comprises reducing the voltage of said power supply.

20. A method as defined in claim 19 wherein said number is two.

21. A method as defined in claim 16 wherein said forcing act comprises reducing the voltage of said power supply.

22. A method as defined in claim 4 including the act of swinging said welding wire as it moves along said transverse path of said selected path.

23. A method as defined in claim 22 including the act of maintaining the spacing of said wire from said backing plate generally constant as it moves along said selected path.

24. A method as defined in claim 4 including the act of maintaining the spacing of said wire from said backing plate generally constant as it moves along said selected path.

25. A method as defined in claim 1 wherein said selected path includes a number of cycles each having a first transverse branch extending from first element to said second element and a successive second transverse branch extending from said second element to said first element with longitudinal branches connecting successive transverse branches and generally perpendicular to said transverse branches and adjacent the intersection of said backing plate and one of said members.

26. A method as defined in claim 25 wherein said branches of selected path includes a number of longitudinally spaced direction changing decision points at the intersection of said backing plate with one of said members where said path is changed generally orthogonally from one branch to the next branch.

27. A method as defined in claim 26 including determination at said decision points the existence of a blow through between said backing plate and one of said metal members.

28. A method as defined in claims 27 including reversing said given direction upon detection of a blow through to move said welding wire back to a decision point and then resuming movement in said given direction.

29. A method as defined in claim 27 including advancing to the next decision point upon failure to detect a blow through.

30. A method as defined in claim 27 including selectively forcing a blow through upon failure to detect a blow through.

31. A method as defined in claim 30 wherein said forced blow through is created by reducing the voltage of said power supply.

32. A method as defined in claim 30 wherein said forcing act is performed upon failure to detect a blow through at a number of successive decision points.

33. A method as defined in claim 32 wherein said forced blow through is created by reducing the voltage of said power supply.

34. A method as defined in claim 33 wherein said number is two.

35. A method as defined in claim 32 wherein said number is two.

36. A method as defined in claim 25 including the act of swinging said welding wire as it moves along said transverse path of said selected path.

37. A method as defined in claim 36 including the act of maintaining the spacing of said wire from said backing plate generally constant as it moves along said selected path.

38. A method as defined in claim 25 including the act of maintaining the spacing of said wire from said backing plate generally constant as it moves along said selected path.

39. A method as defined in claim 1 including the act of maintaining the spacing of said wire from said backing plate generally constant as it moves along said selected path.

40. A system of depositing molten metal from an advancing welding wire to form a root pass of weld metal in the bottom of a gap between first and second metal members having generally flat base elements joined by a metal backing plate extending between said base elements, said system comprising: a power supply for passing welding current between said welding wire and said metal members to create a heat generating welding arc; a robotic mechanism for moving said welding wire in a given direction along selected path over said backing plate; a current sensing mechanism for determining a current drop indicative of a blow through of said backing plate by said welding arc; said mechanism having means for reversing said given direction of said welding wire for a short distance when a blow through has been detected; and, means for then, resuming movement of said welding wire in said given direction along said selected path.

41. A system as defined in claim 40 wherein said current sensing mechanism includes means for measuring said welding current while holding the voltage of said power supply constant and means for detecting a blow through when said welding current is below a set level.

42. A method as defined in claim 41 including the means for adjusting said set level for different welding wires.

43. A system as defined in claim 40 wherein said selected path includes a number of cycles each having a first transverse branch extending from first element to said second element and a successive second transverse branch extending from said second element to said first element with longitudinal branches connecting successive transverse branches and generally perpendicular to said transverse branches and adjacent the intersection of said backing plate and one of said members.

44. A method as defined in claim 43 wherein said branches of selected path includes a number of longitudinally spaced direction changing decision points at the intersection of said backing plate with one of said members where said path is changed generally orthogonally from one branch to the next branch.

45. A system as defined in claim 40 including means for swinging said welding wire as it moves along said transverse path of said selected path.

46. A system as defined in claim 45 including means for maintaining the spacing of said wire said backing plate generally constant as it moves along said selected path.

47. A system as defined in claim 40 including means for maintaining the spacing of said wire from said backing plate generally constant as it moves along said selected path.

48. A method of depositing molten metal from an advancing welding wire carried by a torch to form a root pass of weld meal in the bottom of a gap between first and second metal members having generally flat base element joined by a thin backing plate extending between said base elements to define first and second parallel, longitudinal intersecting seams, said method comprising:

(a) passing a welding current between said welding wire and said metal members from a power supply to create a heat generating welding arc;

(b) moving said welding wire in a given direction along a selected path over said backing plate, said path including branches where said welding wire moves along one of said seams;

(c) sensing an unforced blow through of said backing plate by said welding arc as said welding wire moves along said branch;

(d) creating a forced blow through of said backing plate by said welding arc in the absence a forced or unforced blow through in a selected length of said branch; and, (e) reversing said given direction of said welding wire for a short distance when either a forced or unforced blow through has been sensed; and, (f) then, resuming movement of said welding wire in said given direction along said selected branch.

49. A method of depositing molten metal from an advancing welding wire to form a root pass of weld metal in the bottom of a gap between first and second metal members joined by a metal backing plate extending between said base elements, said method comprising:

(a) passing welding current between said welding wire and said metal members from a power supply to create a heat generating welding arc;

(b) moving said welding wire in a given direction along selected path over said backing plate;

(c) sensing a blow through of said backing plate by said welding arc;

(d) reversing said given direction of said welding wire for a short distance when a blow through has been sensed; and, (e) then, resuming movement of said welding wire in said given direction along said selected path.

50. A method as defined in claim 49 wherein said sensing act involves measuring said welding current while holding the voltage of said power supply constant and detecting a blow through when said welding current is below a set level.

51. A system of depositing molten metal from an advancing welding wire to form a root pass of weld metal in the bottom of a gap between first and second metal members joined by a metal backing plate extending between said base elements, said method comprising: a power supply for passing welding current between said welding wire and said metal members from a power supply to create a heat generating welding arc; a robotic mechanism for moving said welding wire in a given direction along selected path over said backing plate; a comparator circuit for sensing a blow through of said backing plate by said welding arc; a control circuit for reversing said given direction of said welding wire for a short distance when a blow through has been sensed; and a device for then, resuming movement of said welding wire in said given direction along said selected path.

52. A system as defined in claim 51 wherein said comparator circuit involves shunt for measuring said welding current while holding the voltage of said power supply constant and a comparator for detecting a blow through when said welding current is below a set level.

* * * * *